(12) United States Patent
Lu et al.

(10) Patent No.: US 12,439,491 B2
(45) Date of Patent: Oct. 7, 2025

(54) METHOD AND APPARATUS FOR NOISE REJECTION IN DRIVERS FOR DIODES

(71) Applicant: Avago Technologies International Sales Pte. Limited, Singapore (SG)

(72) Inventors: Junjie Lu, Irvine, CA (US); Jing Guo, Irvine, CA (US); Naga Radha Krishna Damaraju, Irvine, CA (US); Xicheng Jiang, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 177 days.

(21) Appl. No.: 18/126,927

(22) Filed: Mar. 27, 2023

(65) Prior Publication Data

US 2024/0334567 A1 Oct. 3, 2024

(51) Int. Cl.
*H05B 45/30* (2020.01)
*H05B 45/345* (2020.01)
*H05B 45/36* (2020.01)

(52) U.S. Cl.
CPC .......... *H05B 45/36* (2020.01); *H05B 45/345* (2020.01)

(58) Field of Classification Search
CPC ...... H05B 45/20; H05B 45/30; H05B 45/345; H05B 45/36; H05B 47/10
See application file for complete search history.

(56) References Cited

U.S. PATENT DOCUMENTS

| 2010/0231137 | A1  | 9/2010  | Keh et al. |
| 2014/0265887 | A1  | 9/2014  | Kamal et al. |
| 2017/0086269 | A1* | 3/2017  | Wang ................. H05B 45/46 |
| 2020/0404752 | A1* | 12/2020 | Lou .................... H05B 45/46 |

FOREIGN PATENT DOCUMENTS

CN 115334708 A * 11/2022 ............. H05B 45/30

OTHER PUBLICATIONS

European Search Report on non-Foley case related to U.S. Appl. No. 18/126,927 DTD Jul. 22, 2024.

* cited by examiner

*Primary Examiner* — Jimmy T Vu
(74) *Attorney, Agent, or Firm* — Foley & Lardner LLP

(57) ABSTRACT

A device includes a first circuit, a ground, a reference voltage source that provides a reference voltage, and a first transistor that includes a first drain, a first source, and a first gate. The first circuit is coupled between the first source and the ground. The device has a second transistor that includes a second source and a second gate. The second transistor is biased as a source follower with the second source of the second transistor being set at the reference voltage. The first gate of the first transistor is coupled to the second gate of the second transistor, the first source has equal voltage as the second source, and the first circuit is coupled between the first source having the reference voltage and the ground to draw a constant current from the first source and to bias the first transistor in the saturation region to reduce parasitic capacitance.

20 Claims, 7 Drawing Sheets

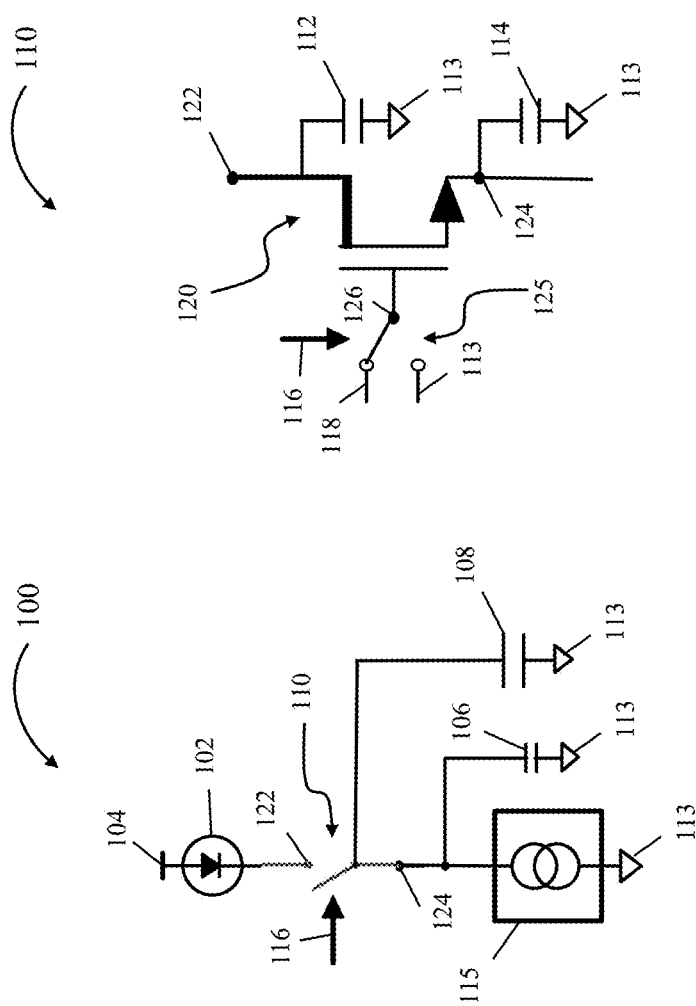

METHOD AND APPARATUS FOR NOISE REJECTION IN DRIVERS FOR DIODES

TECHNICAL FIELD

The present description relates generally to diode driver power supplies, and in particular, to mitigate noise in the diode driver for light emitting diodes (LED) and laser diodes.

BACKGROUND

Voltages generated by the switching power supplies that are used for driving LEDs and laser diodes include fluctuations. The frequency of the fluctuations may coincide with a frequency band of operation of the LEDs or laser diodes pulses and, thus, may affect the current passing through the LEDs and the laser diodes. Additionally, one or more transistors may be used for switching an LED or an array of LEDs and for switching a laser diode or an array of laser diodes. The transistors used for switching may have parasitic capacitors. Depending on the parasitic capacitance value and a frequency of operation of the pulses used for turning on/off the LEDs and the laser diodes, an extra current may pass through the switch and through the LEDs and the laser diodes. The extra current induced by supply noise affects the light generated by the LEDs and the laser diodes and affect the light detected by a photodetector. Thus, the parasitic capacitors may cause supply noise in the detected light, e.g., detected signal. Thus, it is highly desirable to produce laser pulses that minimizes the supply noise in the generated light of the LEDs and the laser diodes.

BRIEF DESCRIPTION OF THE DRAWINGS

Certain features of the subject technology are set forth in the appended claims. However, for purposes of explanation, several aspects of the subject technology are depicted in the following figures.

FIGS. 1A, 1B, and 1C illustrate an LED driver device, an LED driver switch, and a device for driving multiple LEDs.

DETAILED DESCRIPTION

Figure 1C:
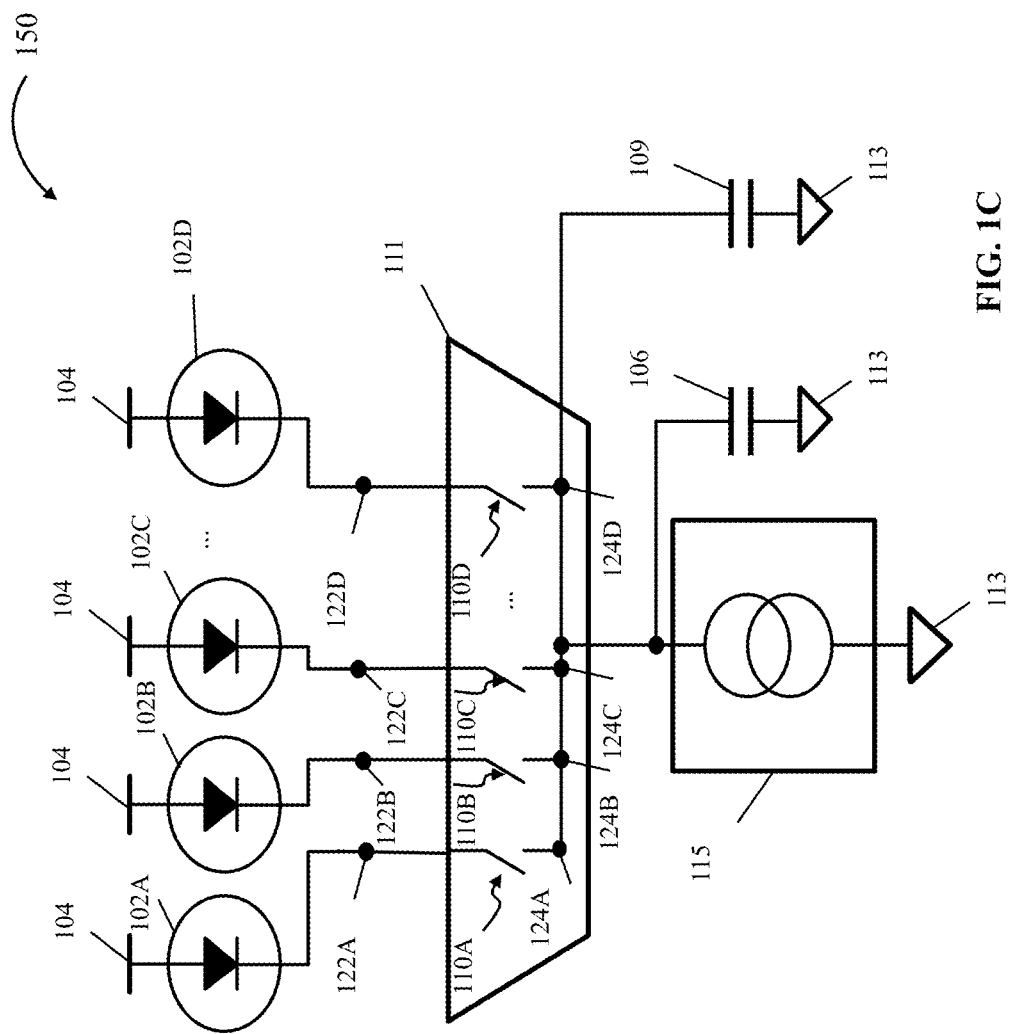

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Switching power supplies are used for driving an LED or a laser diode or driving an array of LEDs or an array of laser diodes. Switching power supplies generate voltage fluctuations that causes fluctuations in the current of the LEDs or the current of the laser dioses and thereby producing ripple in the amount of light intensity produced by the LEDs or the laser diodes. The light intensity fluctuations, e.g., light intensity noise, are detected by light detectors and may unfavorably affect an outcome of the devices or modules, e.g., light sensors and glucose meters, which incorporate the LEDs or laser diodes.

In some embodiments, a switching power supply is coupled to an anode of the LEDs or the laser diodes. Additionally, a driver circuit is coupled to the cathode of the LEDs or the laser diode. The driver circuit draws current from the LEDs or the laser diodes. In some embodiments, a plurality of switches (e.g., transistor switches) are coupled between each LED or each laser diode and the driver circuit to turn on or off the LEDs or the laser diodes. The switches are connected such that the drain node of each transistor switch is coupled to the cathode of the LED and the source node of the transistor switch is coupled to the driver circuit. As discussed below, a device, e.g., a circuit, is introduced below that maintains a constant voltage to the source node of the transistor switches. The constant voltage causes a constant current through the driver circuit and its associated capacitance and, thus, a constant current through the switches and a constant current through the LEDs or the laser diodes. Beneficially, the current remains constant through the LEDs or laser diodes, regardless of if the voltages of the anode or cathode of the LEDs or laser diodes are not constant and include fluctuations.

Another source of current fluctuations in an LED or a laser diode and, thus, light intensity fluctuations, is the parasitic capacitor of the transistor switches. In some embodiments, the parasitic capacitors of the transistor switches cause the fluctuations of the switching power supply current that pass through the LED to reach the source node of the transistor switch and, thus, affect the current through the driver circuit and produce current fluctuations in the LED or the laser diode. In some embodiments, when multiple transistor switches are connected together to drive multiple LEDs, the parasitic capacitances from multiple transistor switches all appears at the LED cathode. As discussed below, the configuration of the transistor switch can be adaptively changed based on the LED current to minimize the effect of the parasitic capacitance. When the device is not driving the full LED current, a portion of the transistor switch may be turned off to prevent formation of a channel region to reduce parasitic capacitance, and the turned on transistor switches may be arranged to operate in the saturation region rather than the ohmic region to reduce the effect of parasitic capacitance. When the device is driving full current, the switch is arranged to operate in an ohmic region rather than a saturation region to reduce a headroom of the driver circuit of an LED for power efficiency.

FIGS. 1A, 1B, and 1C illustrate an LED driver device 100, a switch 110 (e.g., an LED driver switch), and a device 150 for driving multiple LEDs. The LED driver device 100 shows a positive node 104, e.g. a positive voltage node, of a power supply, e.g., the positive node of a switching power supply (not shown), and a ground node 113 that is coupled to a ground. The LED driver device 100 shows an LED 102 coupled to a switch 110 via a first node 122 of the switch 110. Also shown are a driver circuit 115, e.g., a first circuit, which is connected between a second node 124 of the switch 110 and the ground node 113. The LED driver device 100 also shows a capacitor 106 coupled between the second node 124 of the switch 110 and the ground node 113. The switch 110 is controlled by a signal 116 that closes or opens the switch 110 and creates a current pulse through the LED 102. The capacitor 106 is used for filtering the noise to send the noise at the non-grounded node of the driver circuit 115 to the ground node 113 to protect the driver circuit 115 against radio frequency (RF) noise. The capacitor 108 is the parasitic capacitor of the switch 110. As shown, the currents passing through the capacitors 106 and 108 add to each other and pass through the LED 102 and produce current fluctuations and, thus, light intensity fluctuations, e.g., light intensity noise, for the LED 102.

FIG. 1B shows the switch 110 of FIG. 1A. The switch 110 includes a transistor 120, e.g., an NMOS transistor, which operates as a switch. When a gate node 126 of the transistor 120 is coupled to the positive voltage 118, e.g., a positive voltage greater than a drain voltage VDD, the transistor 120 is turned on and when the gate node 126 of the transistor 120 is coupled to the ground node 113, the transistor 120 is turned off. As shown, the signal 116 controls the connection of the gate node 126 of the transistor 120 to either the ground node 113 or the positive voltage 118. In some embodiments, the signal 116 is provided by other circuits and the connection to either the ground node 113 or the positive voltage 118 is provided by an electronic switch 125. As shown, the first node 122 is a drain node of the transistor 120 and the second node 124 is a source node of the transistor 120. FIG. 1B also respectively shows parasitic capacitors 114 and 112 between source node and drain node of the transistor 120. The capacitor 108 of FIG. 1A shows an effective sum of the parasitic capacitors 114 and 112.

FIG. 1C shows the device 150 for driving multiple LEDs. FIG. 1C shows a plurality of LEDs 102A, 102B, 102C, 102D, etc. Anodes of the LEDs 102A, 102B, 102C, 102D are coupled to positive node 104 of the power supply. FIG. 1C shows a switch array 111 that includes a plurality of switches 110A, 110B, 110C, 110D, etc. The switches 110A, 110B, 110C, 110D are coupled via first nodes 122A, 122B, 122C, and 122D to the cathodes of the LEDs 102A, 102B, 102C, and 102D and via second nodes 124A, 124B, 124C, and 124D to the driver circuit 115. At each instance of time, one of the switches 110A, 110B, 110C, or 110D are connected and the other switches are disconnected and, thus, at each instance of time only one of the LEDs is on and generates light. FIG. 1C also shows the capacitor 106 of FIG. 1A and a capacitor 109, which is a parasitic capacitor of the switches 110A, 110B, 110C, and 110D together. Also, the driver circuit 115, the capacitor 106, and the capacitor 109 are coupled between the second nodes 124A, 124B, 124C, or 124D and the ground node 113. In some embodiments, the switches 110A, 110B, 110C, and 110D are NMOS switches. The parasitic capacitor of the NMOS switch is higher when the NMOS switch is in the ohmic region compared to when the NMOS switch is in the saturation region.

In some embodiments, a turned on NMOS switch is biased in the ohmic region where a drain current, flowing from the drain to the source of the transistor, has a linear relation with the changes in the drain-source voltage to reduce the headroom of the driver circuit 115 of an LED for power efficiency. When an NMOS switch does not need to conduct current, the NMOS switch is turned off by coupling the gate node of the NMOS switch to the ground node 113. The parasitic capacitor 109 is much higher when multiple switches are connected to the same node as it also includes the parasitic capacitor of other NMOS switches. Thus, the parasitic capacitor 109 includes the parasitic capacitor of the transistor that is on and the parasitic capacitances of the transistors that are off. Also, if the turned on NMOS is biased in the ohmic region, the parasitic capacitor 109 is directly shown at the nodes 122A, 122B, 122C, or 122D (e.g., cathode nodes) of the LEDs 102A, 102B, 102C, and 102D, respectively. Therefore, any fluctuation of power supplies causes current flowing into this parasitic capacitor which passes through the switch and through the LEDs and the laser diodes.

In some embodiments, the driver circuit 115 has good power supply rejection (PSR) such that the noise voltage of the power supply does not cause noise and fluctuations in the LED current. The PSR becomes more important when driving a light load and the switching regulator works at pulse frequency modulation (PFM) mode with lower switching frequencies that cause higher in-band fluctuations. In some embodiments, the PSR is defined as the driver output impedance and the higher the PSR the more stable current the driver circuit 115 provides. In some embodiments, the driver circuit 115 approaches a current source with a very high impedance such that any supply noise does not alter the current through the LED or laser driver that is being driven by the driver circuit 115.

Figure 2A:
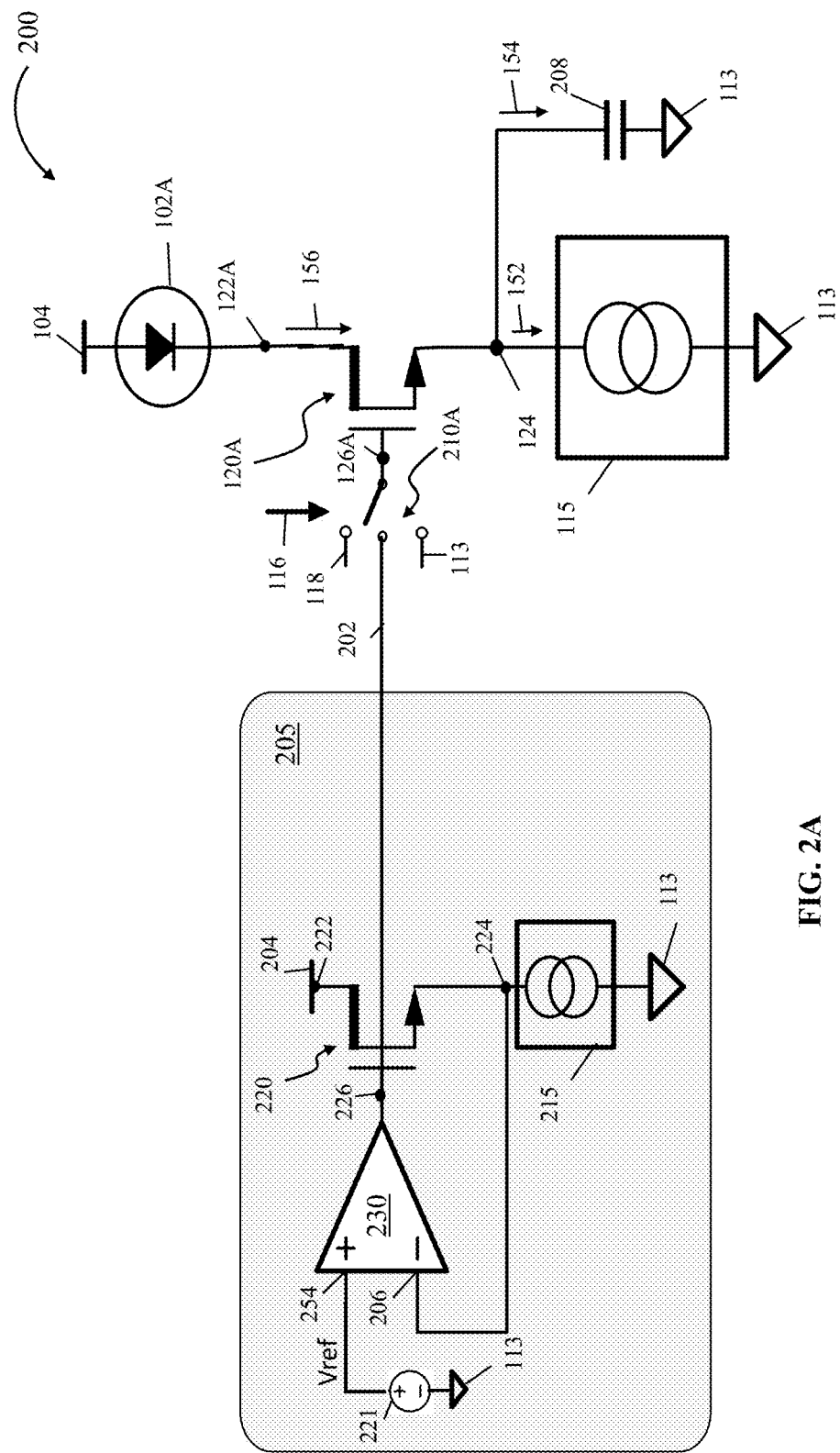
FIGS. 2A and 2B illustrate an LED driver device and a device for driving multiple LEDs, according to various aspects of the subject technology.
Figure 2B:
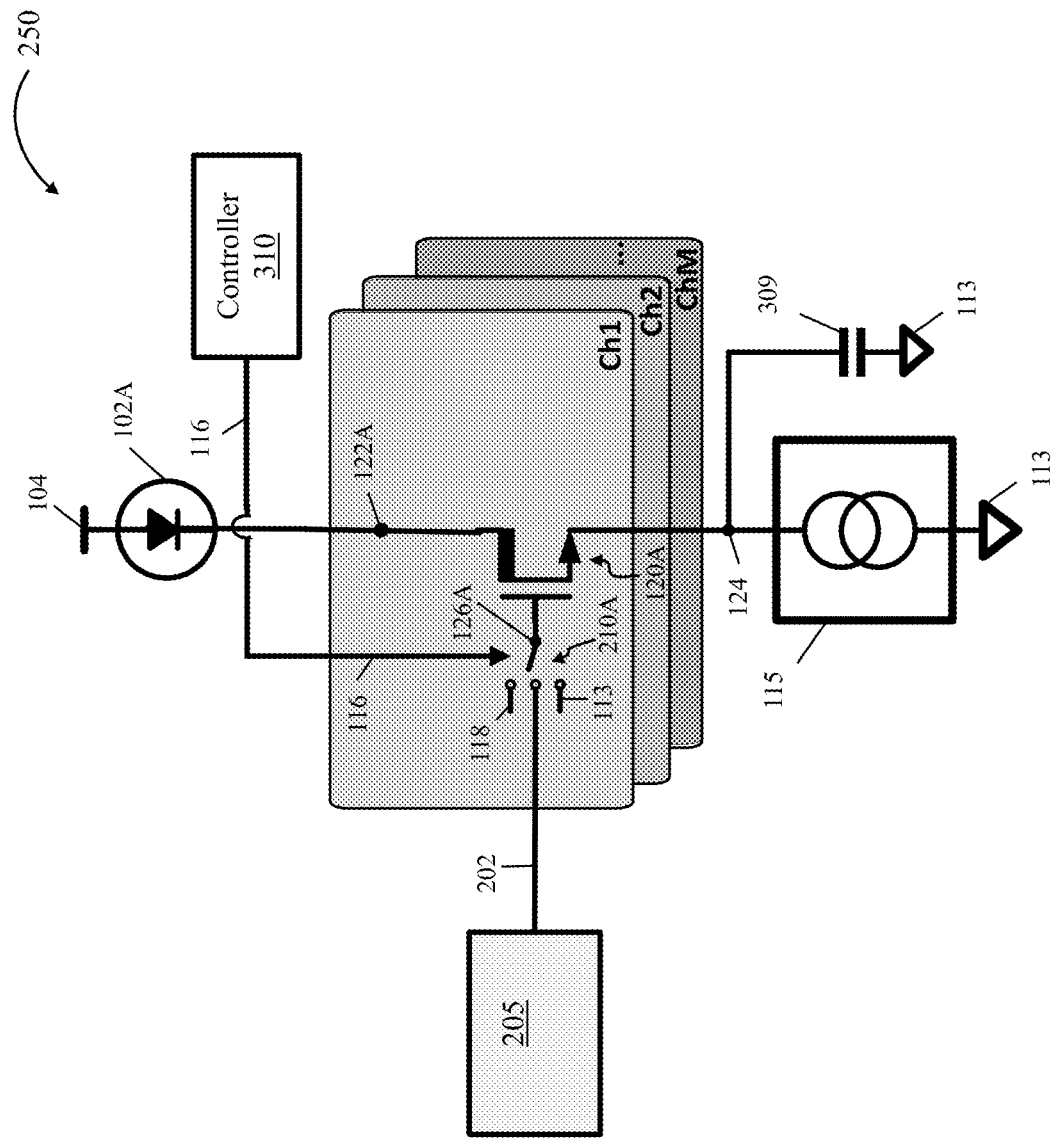

FIGS. 2A and 2B illustrate an LED driver device and a device for driving multiple LEDs, according to various aspects of the subject technology. FIG. 2A shows the LED driver device 200 that includes a transistor 120A, consistent with the transistor 120 of FIG. 1B, that operates as a switch, which is coupled between the first node 122A and the second node 124. The LED driver device 200 includes the LED 102A that is coupled between the positive node 104 of the power supply and the first node 122A. The driver circuit 115 in parallel with a capacitor 208 is coupled between the second node 124 and the ground node 113. The capacitor 208 is a sum of the capacitor 106 and the capacitor 108 of FIG. 1A. As shown, a gate node 126A of the transistor 120A is controlled by the signal 116. The gate node 126A is connected to the positive voltage 118 to bias the transistor 120A in ohmic region or is connected to the ground node 113 to turn the transistor 120A off. In some embodiments, the signal 116, by connecting the gate node 126A to a signal 202 biases the transistor 120A in saturation region. In some embodiments, the signal 116 controls the connection of the gate node 126A via a switch 210A, e.g., an electronic switch. In some embodiments, the capacitor 208 includes the parasitic capacitor of the transistor 120.

FIG. 2A also includes a gate bias circuit 205. The gate bias circuit 205 includes an operational-amplifier, e.g., an Op-Amp 230, a driver circuit 215, and another transistor 220, e.g., an NMOS transistor, and a positive node 204, e.g. a positive voltage node. A node 222 is a drain node of the transistor 220 that is coupled to a positive node 204 of a power supply. A node 224 is a source node of the transistor 220 that is coupled to the driver circuit 215. The driver circuit 215 is coupled between the node 224 and the ground node 113 and the node 224 is coupled to an inverting node 206 of the Op-Amp 230. In some embodiments, a reference voltage source 221 is coupled to a non-inverting node 254 of the Op-Amp 230 to provide a reference voltage (Vref). An output node of the Op-Amp 230 provides a voltage, e.g., an output voltage, at a gate node 226 of the transistor 220 such that the transistor 220 is biased in the saturation region. In some embodiments, the Op-Amp 230 is not saturated and operates in a linear region. Thus, the voltage of the non-inverting node 254 is the same as the voltage of the inverting node 206. Thus, the voltage of the node 224, e.g., the source node of the transistor 220, is at the Vref, which is a constant voltage and the current of the driver circuit 215 is a constant. Also, as shown, the gate node 126A of the transistor 120A is coupled to the gate node 226 of the transistor 220 and the gate node 126A may receive the signal 202, which is a gate voltage of the transistor 220. As shown, the nodes 122A, 124, and 126A are respectively coupled to the drain node, the source node, and the gate node of the transistor 120A and the nodes 222, 224, and 226 are respectively the drain node, the source node, and the gate node of the transistor 220. In some embodiments, in the linear region, the Op-Amp 230 has a gain K between a thousand and ten thousand such that the output voltage of Op-Amp 230 is K times the input voltage, which is the voltage difference between the non-inverting node and the inverting node. Since the output voltage of the Op-Amp 230 is limited by the voltage sources of the Op-Amp 230 that are about 3 to 15 volts, the input voltage of the Op-Amp 230 is very small and about zero volts. Therefore, when the Op-Amp 230 operates in the linear region, the non-inverting and inverting nodes of the Op-Amp 230 may assume to have the same voltage.

In some embodiments, the transistor 120A and the transistor 220 are metal-oxide-semiconductor field-effect transistors (MOSFET). In some embodiments, the transistor 120A and the transistor 220 have the same type of an n-channel MOSFET (NMOS). In some embodiments, the transistor 220 is arranged, e.g., biased, as a source follower and, thus, the transistor 120A is biased as a source follower.

In some embodiments, the transistor 120A (e.g., a first transistor) and the transistor 220 (e.g., a second transistor) have same parameters, e.g., developed with same process parameters and are located at proximity of each other. Thus, the transistor 120A and the transistor 220 may be on the same die and may have developed under the same temperature, process timings, and with the same dopant and density. Thus, the transistor 120A is biased in a manner similar to the bias of the transistor 220, e.g., the transistor 120A and the transistor 220 are mirror biased. Thus, the transistor 120A is also biased in the saturation region and the voltage of the second node 124 is the same voltage, e.g., equal voltage, as the voltage of the node 224 (e.g., the source node) of the transistor 120A. Thus, the voltage of the source node of the transistor 120A is Vref, e.g., a constant voltage, and a constant voltage is applied to the driver circuit 115. Thus, in some embodiments, because the voltage Vref is applied to the driver circuit 115, the current of the driver circuit 115 is a constant and is independent of, e.g., does not depend on, the voltage of the positive node 104 and does not follow the voltage of the positive node 104. Thus, the current of the driver circuit 115 is a constant and also the current of the driver circuit 215 is a constant. By biasing the transistor 120A in the saturation region, the transistor 120A works as a cascode to increase the impedance of the driver circuit 115 to make it closer to an ideal current source. The cascode effect prevents the noise on the positive node 104 from propagating to the source node 124 and, thus, preventing the supply noise being converted to current noise by the capacitor 208. If the transistor 120A is biased in the ohmic region, any noise on the positive node 104 will be passed to source node 124 and be converted to current noise, causing degradation in system performance. As shown if FIG. 2A, because the voltage of the second node 124 is constant, e.g., the voltage is Vref, a current 152 of the driver circuit 115 is a constant. In some embodiments, the noise voltage on the parasitic capacitance is reduced such that a noise current 154, which includes a parasitic current is negligible compared to the current 152. Thus, a current 156 of the LED 102A is essentially a constant and when generating the light intensity, the light intensity produced by the LED 102A is constant. Thus, in some embodiments, reducing the noise voltage on the parasitic capacitance of the transistor 120A, reduces the current noise drawn from the LED 102A. In some embodiments, having two equal resistors is having two resistors with resistances that are in a range between negative five percent to positive five percent of each other. Also, in some embodiments, having equal parameters for two circuit components, e.g., two transistors, is having parameters of one component in a range between negative five percent to positive five percent of the parameters of the other component.

FIG. 2B shows a device 250 for driving multiple LEDs that includes the gate bias circuit 205 and the LED driver device 200. As described above, the LED driver device 200 includes the transistor 120A coupled between the first node 122A and the second node 124 and the LED 102A that is coupled between the positive node 104 of the power supply and the first node 122A. The driver circuit 115 is in parallel with a capacitor 309. The capacitor 309, which is a parasitic capacitor in some embodiments, is coupled between the second node 124 and the ground node 113. As shown, a gate node of the transistor 120A is controlled by the signal 116 via a switch 210A. The gate node 126A of the transistor 120A is connected to the positive voltage 118 to bias the transistor 120A in ohmic region, or the gate node of the transistor 120A is connected to the ground node 113 to turn the transistor 120A off. In some embodiments, the signal 116 causes the coupling of the gate node of the transistor 120A to the gate node 226 of the transistor 220 to receive the signal 202 that biases the transistor 120A in the saturation region. In some embodiments, a controller determines which voltage to be connected to the gate node 126A based on the LED current level and/or other device 250 information. As mentioned above, under the light load condition when the LED current is low, the supply noise is higher due to the switching power supply of the LED operating in the PFM mode. In this condition, The gate node is connected to the gate node 226 of the transistor 220 to receive the signal 202 to bias the transistor 120A in the saturation region to boost noise rejection, e.g., to reduce noise. And under the heavy load condition, the gate node 126A is connected to the positive voltage 118 to maximize the gate-source voltage of 120A and bias the transistor 120A in the ohmic region, which minimizes the voltage drop across the transistor 120A and improve power efficiency. The supply noise rejection may be less as the switching power supply of the LED is operating in a pulse width modulation (PWM) mode having a constant frequency higher than the PFM mode such that the noise may be out of a signal band used by the device 250.

The device 250 for driving multiple LEDs further includes multiple transistors the same as the transistor 120A that are arranged, e.g., coupled, in parallel such that there are M transistors. Also, the device 250 includes multiple switches, the same as the switch 210A, that are coupled between the gate node 226 of the transistor 220 and each one of the gate nodes of the M transistors. Further includes multiple LEDs, the same as the LED 102A. Each LED is coupled between the first node 122A, e.g., a drain node, of a separate transistor and the positive node 104 of the power supply. In some embodiments, the M drains of the M transistors are separately coupled to cathodes of separate LEDs, however, the M sources of the M transistors are coupled together and are coupled to the second node 124. In some embodiments, each one of the M gates of the M transistors are coupled to a separate switch, the same as the switch 210A. The device 250 also includes a controller 310. The controller 310 is generating the signal 116, e.g., one or more command signals that are coupled to each gate node 126 of the M transistors. As noted, the signal 116 may turn on the transistors either is the ohmic region or in the saturation region and may turn off the transistors. In some embodiments, at each instance of time only one switch is connected to the signal 202. Thus, only one transistor is turned on and only one LED is generating light, while the other transistors are turned off. Then, the controller 310 alternately connects each gate node of the other transistors of the M transistors to the signal 202, which is coupled to the gate node 226 of the transistor 220 (shown in FIG. 2A), to alternately turn on the other LEDs. Thus, in some embodiments, at each instance of time only one LED is turned on and other LEDs are turned off. In some embodiments, the controller 310 alternately connects two or more gate nodes of the M transistors to the signal 202, which is coupled to the gate node 226 of the transistor 220 (shown in FIG. 2A), to alternately turn on two or more LEDs at each instance of time, e.g., at each moment or at each time.

In some embodiments, the capacitor 309 includes parasitic capacitors of the M transistors. In some embodiments, the controller 310 sends or exchanges the signals 116, e.g., commands or instructions, to define how to turn on/off each transistor and for how long turn each transistor on or off. In some embodiments, each one of the M transistors are turned on in the saturation region and other transistors are turned off to reduce the parasitic capacitor and, thus, reduce the capacitor 309. As shown, the source nodes of the M transistors are coupled together and are coupled to the driver circuit 115. In this configuration, the capacitor 309 on the node 124 is about M times higher capacitance compared to the capacitance of the capacitor 208 of FIG. 2A, making it even more important to reduce the supply induced noise on 124 node by biasing the transistor in the saturation mode. Also, each drain node of the M transistors are coupled to a separate cathode of one of the LEDs. FIG. 2B shows only one LED, one transistor, and one switch, and, thus, is a representative of other LEDs, other transistors, other switches, etc.

Figure 3A:
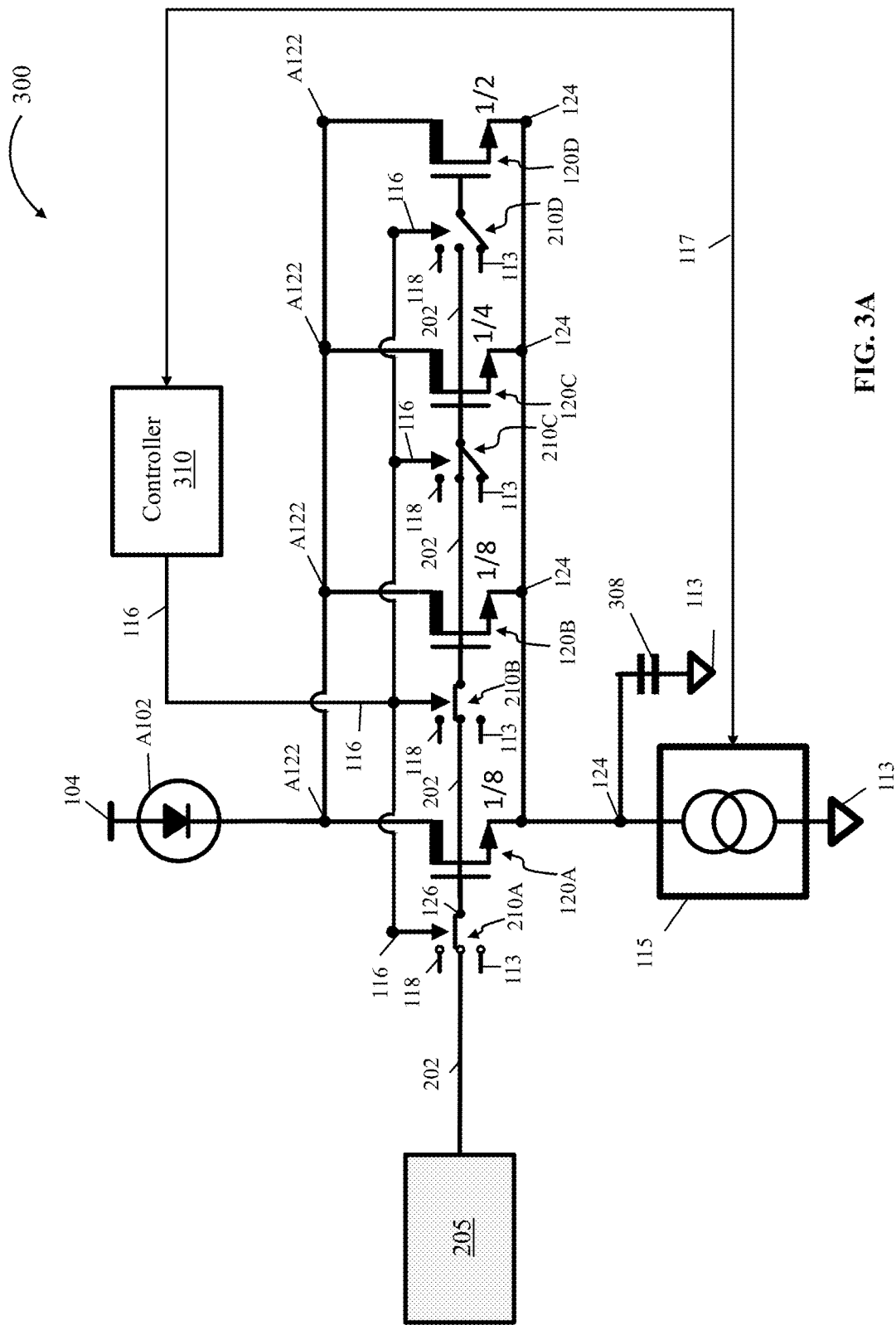
FIGS. 3A, 3B, and 3C illustrate an LED driver device using multiple transistors and a device for driving multiple LEDs, according to various aspects of the subject technology.
Figure 3B:
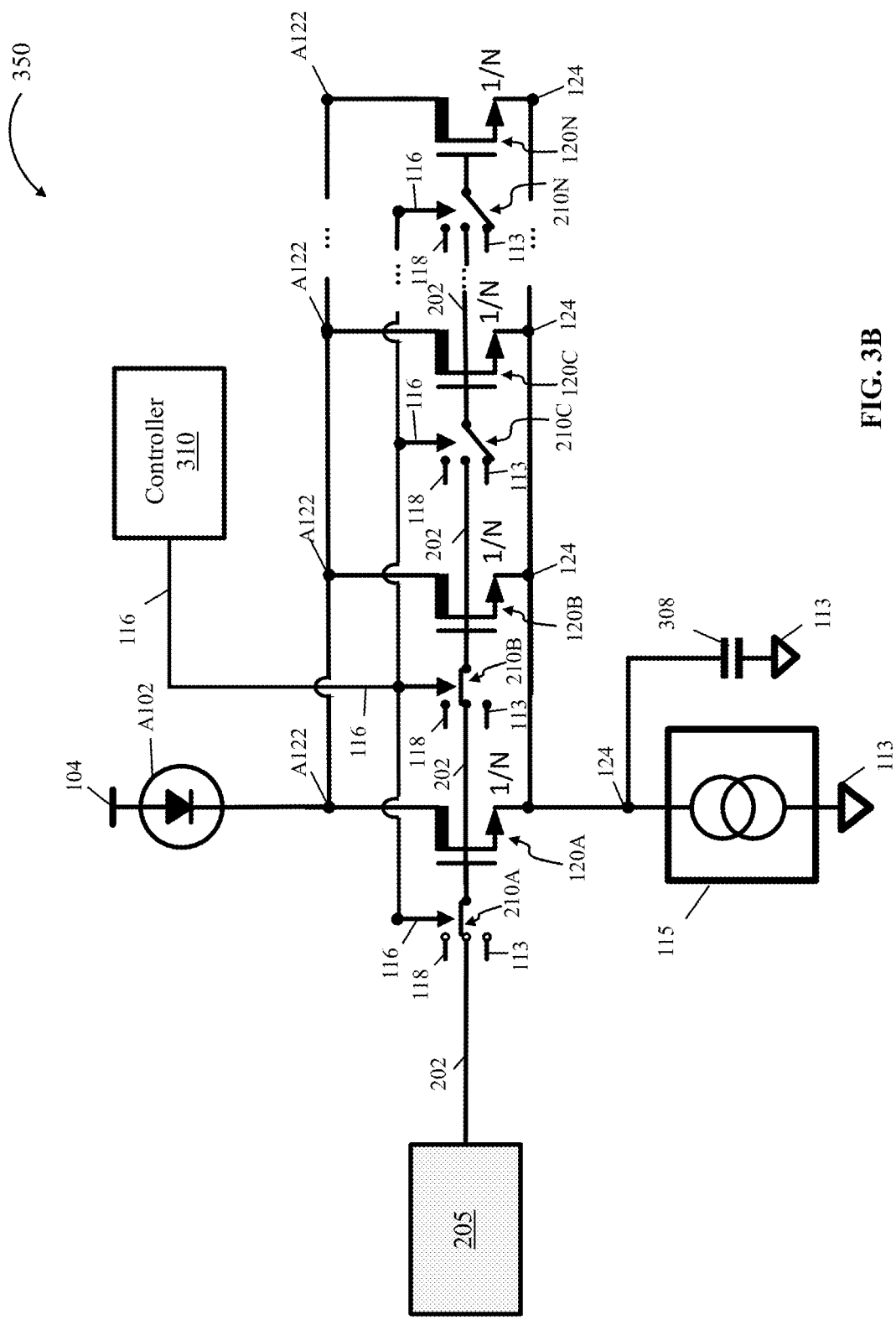
Figure 3C:
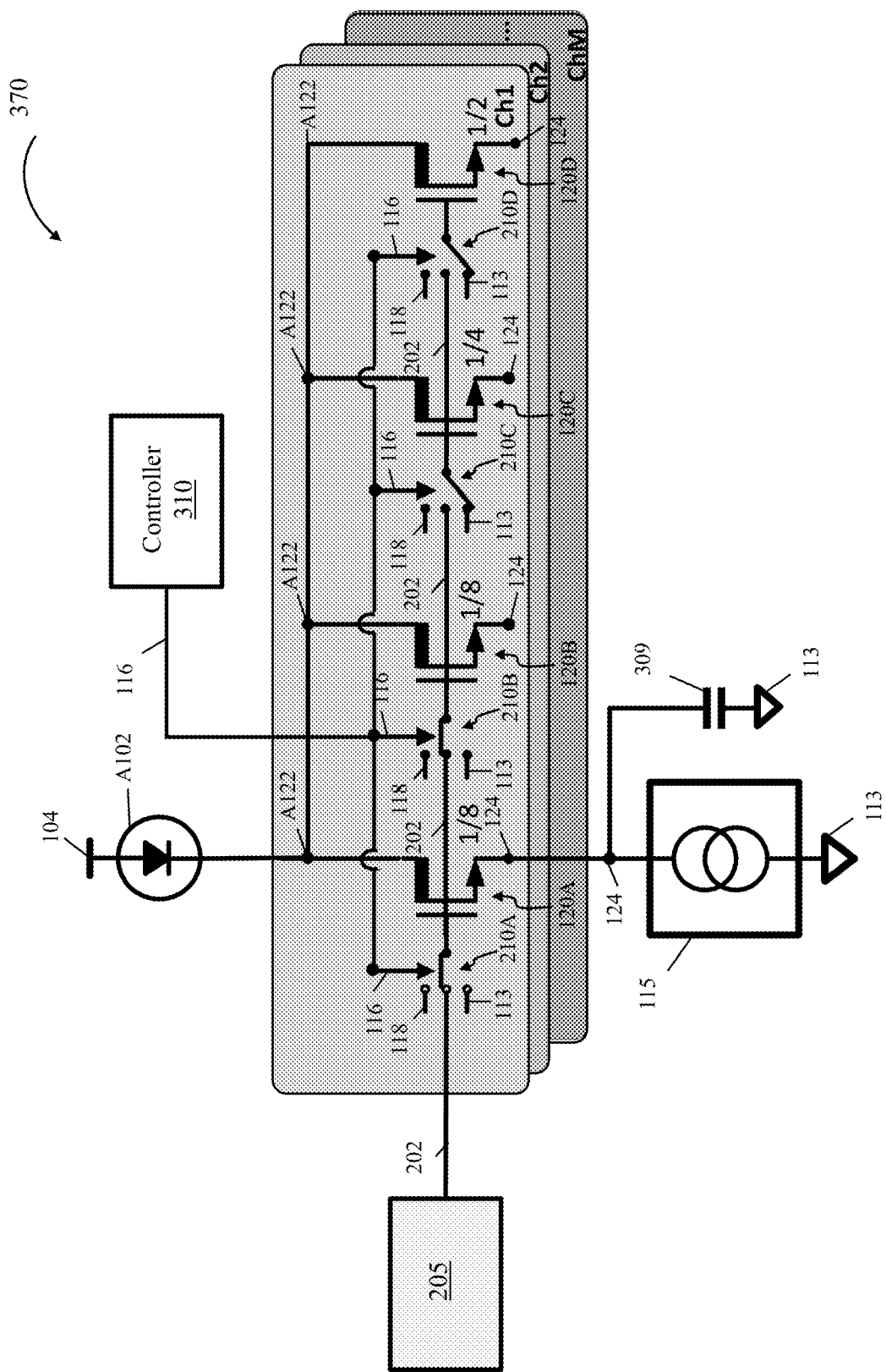

FIGS. 3A, 3B, and 3C illustrate an LED driver device using multiple transistors and a device for driving multiple LEDs, according to various aspects of the subject technology. As shown, FIG. 3B includes a group of N transistors and FIG. 3A includes a group of 4 transistors. FIG. 3A shows LED driver devices 300 and FIG. 3B shows LED driver devices 350. The LED driver devices 300 and 350 includes the gate bias circuit 205, the positive node 104 of the power supply, the LED A102, a capacitor 308, e.g., a parasitic capacitor, and a driver circuit 115. The capacitor 308 and the driver circuit 115 are connected in parallel between the ground node 113 and the second node 124. In some embodiments, FIG. 3A include two or more transistors, e.g., transistors 120A, 120B, 120C, and 120D. FIG. 3B includes two or more transistors, e.g., transistors 120A, 120B, 120C, ... and 120N. The drain nodes of the transistors in the LED driver devices 300 and 350 are coupled together and to the first node A122 and the source nodes of the transistors in the LED driver devices 300 and 350 are coupled together and to the second node 124. A gate node of each transistor 120A, 120B, 120C, and 120D of FIG. 3A is coupled via one of the switches 210A, 210B, 210C, and 210D and a separate connection to the gate node 226 of the transistor 220 in the gate bias circuit 205 to receive the signal 202. A gate node of each transistor 120A, 120B, 120C, ... and 120N of FIG. 3B is coupled via one of the switches 210A, 210B, 210C, ... , and 210N and a separate connection to the gate bias circuit 205 to receive the signal 202. As noted, in some embodiments, the capacitance value of the capacitor 308 includes the capacitance values of the parasitic capacitors of the transistors.

Each of the LED driver devices 300 and 350 also includes a controller 310. The controller 310 is generating the signal 116, e.g., one or more command signals. The signal 116 may turn on the transistors either in the saturation region, by connecting the gate node to signal 202, or in the ohmic region, by connecting the gate node to the positive voltage 118, and may turn off the transistors by connecting the gate node to the ground node 113. In some embodiments, at each instance of time one or more transistors are turned on and the other transistors are turned off and only the transistors that are turned on draw current from the LED A102. By turning on the selected transistors and turning off the other transistors among transistors 120A, 120B, 120C, ... and 120N, according to the amplitude of LED current, the capacitance value of the capacitor 308 is minimized. In FIG. 3A, a gate of each transistor 120A, 120B, 120C, or 120D is separately connected via a switch 210A, 210B, 210C, or 210D, respectively, to the gate bias circuit 205 to receive the signal 202 when the switch is closed. In FIG. 3B, a gate of each transistor 120A, 120B, 120C, ... or 120N is separately connected via a switch 210A, 210B, 210C, ... or 210N, respectively, to the gate bias circuit 205 to receive the signal 202 when the switch is closed. Thus, depending on a required current of the LED A102, one or more switches 210A, 210B, 210C, ... are closed and one or more transistors 120A, 120B, 120C, ... are turned on to provide the required current for the LED A102 and keep the switches coupled to the gates of the rest of the transistor opened to turned off the rest of the transistors.

In some embodiments, there are eight transistors and the transistors are designed such that each transistor draws an equal portion, e.g., $\frac{1}{8}^{th}$, of a predetermined amount of current, e.g., a first amount of current, from the LED A102. The predetermined amount of current may produce a predefined amount of light, e.g., first amount of light, by the LED A102. In some embodiments, there are four transistors, e.g., the transistors 120A, 120B, 120C, and 120D, and the transistors are designed such that, each transistor draws an equal portion, e.g., $\frac{1}{4}^{th}$, of the predetermined amount of current from the LED A102. In some embodiments, there are four transistors, e.g., the transistors 120A, 120B, 120C, and 120D, of FIG. 3A and the transistors are designed such that, the transistors draw different portions, e.g., $\frac{1}{8}^{th}$, $\frac{1}{4}^{th}$, or $\frac{1}{2}^{th}$, of the predetermined amount of current from the LED A102. In some embodiments, the transistors 120A, 120B, 120C, ... and 120N, of FIG. 3B are designed such that each transistor draws an equal portion, e.g., $1/N^{th}$ (with N being 2, 3, 4, 5, ... ), of the predetermined amount of current from the LED 102. In some embodiment, each transistor draws a different portion of the predetermined amount of current from the LED A102.

In some embodiments, when the predefined amount of light is decreased, the predetermined amount of current is also decreased and only a fraction of the transistors are turned on to provide the required current of the LED A102 and the other transistors are turned off to reduce, e.g., minimize, a total parasitic capacitance. In some embodiments, the current drawn from the LED A102 is determined by the current drawn by the driver circuit 115. Based on the current of the driver circuit 115, the current drawn from the LED A102, is adjusted by opening or closing switches 210A, 210B, 210C, . . . that may be performed by the controller 310. The controller 310 may communicate with the driver circuit 115 using a signal/instruction 117. In some embodiments, one or more groups of two or more transistors are combined such that in FIG. 3A, one transistor draws ⅜ of the predetermined amount of current, another transistor draws ⅖, or ¼, of the predetermined amount of current and three other transistors each draws ⅛ of the predetermined amount of current.

FIG. 3C shows device 370 for driving multiple LEDs that includes the gate bias circuit 205 and the LED driver device 300 that includes the transistors 120A, 120B, 120C, and 120D coupled between the first node A122 and the second node 124 and the LED A102 that is coupled between the positive node 104 of the power supply and the first node A122. The driver circuit 115 in parallel with the capacitor 309, a parasitic capacitor, which is coupled between the second node 124 and the ground node 113. As shown, a gate node of the transistor 120A is controlled by receiving the signal 116 via a switch 210A. The gate node of one or more of the transistors 120A, 120B, 120C, and 120D are connected to the positive voltage 118 to bias the one or more transistors in the ohmic region or is connected to the ground node 113 to turn the one or more transistor off. In some embodiments, the signal 116, by connecting the gate node of one or more transistors to a signal 202 biases the transistor in the saturation region. In some embodiments, the capacitor 309 includes a filtering capacitor, consistent with the capacitor 106 of FIG. 1A, which is used for filtering the noise. The capacitor 309 may also represent an effective parasitic capacitor of the transistors, added together. Thus, FIG. 3C shows M groups of four transistors, where each set the four transistors are arranged, e.g., coupled, parallel to each other.

The device 370 for driving multiple LEDs includes multiple sets, e.g., M sets, of a group of transistors, e.g., the transistors 120A, 120B, 120C, and 120D of FIG. 3A. Each set includes a group of switches, e.g. the switch 210A, 210B, 210C, and 210D of FIG. 3A, and each set is driving a separate LED the same as the LED A102. The device 370 also includes a controller 310. The controller 310 can generate the signal 116, e.g., one or more command signals. As noted, the signal 116 may turn on the transistors either in the ohmic region or in the saturation region and may turn off the transistors. In some embodiments, at each instance of time only one transistor is turned on the other transistors are turned off and thus only one LED is generating light. Also, in some embodiments, one driver circuit 115 is connected between the ground node 113 and the source nodes of the M group of multiple transistors, e.g., N transistors. In some embodiments, as noted, the capacitor 309 includes the parasitic capacitor of the M group of multiple transistors. In some embodiments, the controller 310 sends the signal 116, e.g., a command, to the switches to turn on/off each transistor and for how long turn each transistor on or off. In some embodiments, each one of the M groups of multiple transistors are turned on in saturation region and other transistors are turned off to reduce the parasitic capacitor and, thus, to reduce the capacitance value of the capacitor 309.

The subject technology discussed above provides a device or a circuit for driving an LED or laser diode with constant current. A driver circuit of the LED or the laser diode is configured to drive a constant current from the LED or the laser diode. Also, When the LED or laser diode is on, the transistor is maintained in the saturation region to reduce the noise current caused by the parasitic capacitor. Thus, to reduce the noise current of the LED or laser diode. In addition, the current from the LED or the laser diode may be driven by a plurality of transistors and only a portion of the transistors are turned on to provide a predefined current and turn other transistors off to reduce parasitic capacitor and, thus, to reduce the noise of the current of the LED or the laser diode.

According to aspects of the subject technology, a device includes a first circuit, a ground node, a reference voltage source configured to provide a reference voltage, and a first transistor that includes a first drain node, a first source node, and a first gate node. The first circuit is coupled between the first source node and the ground node. The device also includes a second transistor that includes a second drain node, a second source node, and a second gate node. The second transistor is biased as a source follower with second source node being set at the reference voltage such that the first gate node is coupled to the second gate node, the first source node has equal voltage as the second source node, the first circuit drives a constant current from the first source node that is independent of a voltage of the first drain node of first transistor, and the first transistor is biased in a saturation region to reduce parasitic capacitance.

In an aspect of the subject technology, the first and second transistors are mirror biased. In an aspect of the subject technology, the voltage of the first source node is independent of a voltage of the first drain node. In an aspect of the subject technology, the device further includes a second circuit coupled between the second source node and the ground node and to draw the constant current from the second source node. In an aspect of the subject technology, the device further includes a first light emitting diode (LED) coupled between the first drain node and a positive voltage node. The first transistor draws the constant current from the first LED. In an aspect of the subject technology, the device further includes one or more transistors coupled in parallel with the first transistor. Source nodes of the one or more transistors are coupled to the first circuit and gate nodes of the one or more transistors are coupled to the second gate node of the second transistor. Two or more switches are coupled between the second gate node and the first gate node and between the second gate node and each gate node of the one or more transistors. Two or more LED such that each LED of the two or more LEDs is coupled between the first drain node and a positive voltage node and between each drain node of the one or more transistors and the positive voltage node. A controller is coupled to each one of the two or more switches to alternately connect the first gate node and each gate node of the one or more transistors to the second gate node such that the controller alternately turns on the two or more LEDs. In an aspect of the subject technology, the device further includes one or more transistors coupled in parallel with the first transistor. Source nodes of the one or more transistors are coupled to the first circuit and gate nodes of the one or more transistors are coupled to the second gate node of the second transistor. Two or more switches coupled between the second gate node and the first gate node and between the second gate node and each gate node of the one or more transistors. A controller coupled to each one of the two or more switches to alternately connect the first gate node or each gate node of the one or more transistors to the second gate node.

According to aspects of the subject technology, a device includes a reference voltage source configured to provide a reference voltage, a first positive voltage node, a first light emitting diode (LED), a first transistor that includes a first drain node, a first source node, and a first gate node, such that the first LED is coupled between the first drain node and the first positive voltage node. The device also includes a second transistor that includes a second drain node, a second source node, and a second gate node, such that the second transistor is biased as a source follower with second source node being set at the reference voltage. The first gate node is coupled to the second gate node, the first and second transistors are mirror biased, the first transistor has the reference voltage at the first source node, and the first transistor drives a constant current from the first LED that is independent of a voltage of the first drain node.

In an aspect of the subject technology, the second transistor is biased in the saturation region. In an aspect of the subject technology, the device further includes a first circuit and a ground node. The first circuit is coupled between the first source node and the ground node. In response to a voltage of the first circuit being the reference voltage, the first circuit draws the constant current from the first LED. In an aspect of the subject technology, the device further includes one or more transistors coupled in parallel with the first transistor such that source nodes of the one or more transistors are coupled to the first circuit, and gate nodes of the one or more transistors are coupled to the second gate node of the second transistor. Two or more switches are coupled between the second gate node and the first gate node and between the second gate node and each gate node of the one or more transistors. One or more LEDs, such that each one of the one or more LEDs is coupled between each drain node of the one or more transistors and the first positive voltage node. Also, a controller is coupled to each one of the two or more switches to alternately connect the first gate node or each gate node of the one or more transistors to the second gate node and the controller alternately turns on the first LED or one of the one or more LEDs. In an aspect of the subject technology, the first circuit is a current source. In an aspect of the subject technology, the device further includes a second circuit that includes the second transistor and the reference voltage source such that the second circuit further includes an operational-amplifier (OP-Amp) with a non-inverting node of the OP-Amp that is coupled to the reference voltage source and with an inverting node of the OP-Amp that is coupled to the second source node, and with an output node of the OP-Amp that is coupled to the second gate node. A second positive voltage node that is coupled to the second drain node, a ground node, and a current source that is coupled between the second source node and the ground node. In an aspect of the subject technology, the OP-Amp operates in a linear region, and in response to the OP-Amp being in the linear region, the second source node is set to the reference voltage.

According to aspects of the subject technology, a device includes a first circuit, a first light emitting diode (LED) that produces light in response to receiving a first amount of current, a first group of N first transistors such that N is greater than one, and each first transistor includes a first drain node, a first source node, and a first gate node. The first LED is coupled between each first drain node of the N first transistors and a positive voltage node, and the first circuit is coupled between each first source node of the N first transistors and a ground node. The device also includes a second transistor that includes a second source node, and a second gate node. The second transistor is biased as a source follower with second source node being set at a reference voltage. Also, each first gate node of the N first transistors is coupled to the second gate node of the second transistor via at least one switch. In response to each first gate node of the N first transistors being connected to the second gate node, each first source node of the N first transistors is set to the reference voltage to bias each N first transistors in a saturation region and to draw 1/N of first amount of current from the first LED.

In an aspect of the subject technology, the device further includes a first group of N switches. The first group of N switches connect each first gate node of a first transistor to either i) the ground node, or ii) the second gate node. In response to the first gate node being connected to the ground node, the first transistor turns off and does not draw current from the first LED. In response to the first gate node being connected to the second gate node, the first transistor is biased to turn on and to draw 1/N of the first amount of current from the first LED, and in response to each first gate node of the N first transistors being connected to the second gate node, the first amount of current is drawn by the N first transistors of the first group from the first LED. In an aspect of the subject technology, the device further includes a controller that determines a first amount of current for the first LED to produce a first amount of light. Also, the controller connects first gate nodes of one or more first transistors of a first portion of the first group to the second gate node and to connect first gate nodes of one or more first transistors other than the first portion of the first group to the ground node. The one or more first transistors of the first portion are biased to turn on and the one or more first transistors other than the first portion are turned off, and the one or more first transistors of the first portion are biased to draw one or more times the 1/N of the first amount of current that is equal to the first amount of current from the first LED and the one or more first transistors other than the first portion are biased to draw no current from the first LED. In an aspect of the subject technology, 18 the device further includes a controller and one or more groups of N first transistors in addition to the first group of N first transistors to provide M groups of N first transistors such that the M groups are coupled in parallel and each first transistor incudes the first drain node, the first source node, and the first gate node. Also, the device also includes one or more LEDs in addition to the first LED to provide M LEDs such that for each group of the M groups, a separate LED is coupled between each first drain node of the N first transistors and the positive voltage node. And the device further includes one or more other groups of N switches such that each group of N switches corresponds to one group of the M groups and the N switches of each group are coupled to the controller. Each first gate node of the N first transistors of each group is coupled to the second gate node of the second transistor via at least one switch such that in response to each first gate node of the N first transistors being connected to the second gate node, the first source node of a corresponding first transistor is set to the reference voltage and to draw 1/N of the predetermined amount of current from an LED. In an aspect of the subject technology, the controller is coupled to each one of the N switches of each group of the M groups to alternately connect one or more first gate nodes of the N first transistors of each group to the second gate node to alternately draw current from one of the M LEDs. In an aspect of the subject technology, 20 at each instance of time: i) one or more first transistor of a first group of N first transistors are connected to second gate node, ii) other first transistors of the first group are turned off to reduce parasitic capacitor, and iii) the N first transistors of groups of N first transistors other than the first group are turned off to reduce the parasitic capacitor.

Those of skill in the art would appreciate that the various illustrative blocks, modules, elements, components, memory systems, and algorithms described herein may be implemented as electronic hardware, computer software, or combinations of both. To illustrate this interchangeability of hardware and software, various illustrative blocks, modules, elements, components, memory systems, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks should be performed. Any of the blocks may be simultaneously performed. In one or more implementations, multitasking and parallel processing may be advantageous. Moreover, the separation of various system components in the embodiments described above should not be understood as requiring such separation in all embodiments, and it should be understood that the described program components and systems could generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the term "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" and "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject but rather are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as "an aspect," "the aspect," "another aspect," "some aspects," "one or more aspects," "an implementation," "the implementation," "another implementation," "some implementations," "one or more implementations," "an embodiment," "the embodiment," "another embodiment," "some embodiments," "one or more embodiments," "a configuration," "the configuration," "another configuration," "some configurations," "one or more configurations," "the subject technology," "the disclosure," "the present disclosure," and other variations thereof and alike are for convenience and do not imply that a disclosure relating to such phrase(s) is essential to the subject technology or that such disclosure applies to all configurations of the subject technology. A disclosure relating to such phrase (s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skilled in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f) unless the element is expressly recited using the phrase "means for" or, in the case of a memory system claim, the element is recited using the phrase "step for."

The previous description is provided to enable any person skilled in the art to practice the various aspects described herein. Various modifications to these aspects would be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   a first circuit;
   a ground node;
   a reference voltage source configured to provide a reference voltage;
   a first transistor that comprises a first drain node, a first source node, and a first gate node, wherein the first circuit is coupled between the first source node and the ground node;
   a second transistor that comprises a second source node and a second gate node, wherein the second transistor is configured to be biased as a source follower with the second source node being set at the reference voltage, wherein:

the first gate node is coupled to the second gate node, the first source node has equal voltage as the second source node, the first circuit is configured to drive a constant current from the first source node, a voltage of the first source node is independent of a voltage of the first drain node of first transistor, and the first transistor is biased in a saturation region to reduce a parasitic capacitance;

a group of one or more switches to: (i) connect the first gate node of the first transistor to the ground node or the second gate node and (ii) the second gate node to the ground node or a third gate node; and a controller configured to determine an amount of current and based at least on the amount of current turns on or off each of the one or more switches of the group.

2. The device of claim 1, wherein the first and second transistors are mirror biased.

3. The device of claim 1, wherein a voltage of the second source node is independent of a voltage of a second drain node of the second transistor.

4. The device of claim 1, further comprising:
a second circuit coupled between the second source node and the ground node, the second circuit configured to draw the constant current from the second source node.

5. The device of claim 1, further comprising:
a first light emitting diode (LED) coupled between the first drain node and a positive voltage node, wherein the first transistor is configured to draw the constant current from the first LED.

6. The device of claim 1, further comprising:
one or more transistors coupled in parallel with the first transistor, wherein source nodes of the one or more transistors are coupled to the first circuit, and wherein gate nodes of the one or more transistors are coupled to the second gate node of the second transistor;

two or more LEDs, wherein each LED of the two or more LEDs is coupled between the first drain node and a positive voltage node and between each drain node of the one or more transistors and the positive voltage node.

7. The device of claim 1, further comprising:
one or more transistors coupled in parallel with the first transistor, wherein source nodes of the one or more transistors are coupled to the first circuit, and wherein gate nodes of the one or more transistors are coupled to the second gate node of the second transistor.

8. A device, comprising:
a reference voltage source configured to provide a reference voltage;
a first positive voltage node;
a first light emitting diode (LED);
a ground node;
a first transistor that comprises a first drain node, a first source node, and a first gate node, wherein the first LED is coupled between the first drain node and the first positive voltage node;
a second transistor that comprises a second drain node, a second source node, and a second gate node, wherein the second transistor is configured to be biased as a source follower with second source node being set at the reference voltage, wherein:

the first gate node is coupled to the second gate node, the first and second transistors are mirror biased, the first transistor is configured to have the reference voltage at the first source node, the first transistor is configured to drive a constant current from the first LED that is independent of a voltage of the first drain node, and the first transistor is biased in a saturation region to reduce a parasitic capacitance;

a group of one or more switches to: (i) connect the first gate node of the first transistor to the ground node or the second gate node and (ii) the second gate node to the ground node or a third gate node; and a controller configured to determine an amount of current and based at least on the amount of current turns on or off each of the one or more switches of the group.

9. The device of claim 8, wherein the second transistor is configured to be biased in the saturation region.

10. The device of claim 8, further comprising:
a first circuit; and
a ground node, wherein the first circuit is coupled between the first source node and the ground node, and wherein in response to a voltage of the first circuit being the reference voltage, the first circuit is configured to draw the constant current from the first LED.

11. The device of claim 10, further comprising:
one or more transistors coupled in parallel with the first transistor, wherein source nodes of the one or more transistors are coupled to the first circuit, and wherein gate nodes of the one or more transistors are coupled to the second gate node of the second transistor; and one or more LEDs, wherein each one of the one or more LEDs is coupled between each drain node of the one or more transistors and the first positive voltage node.

12. The device of claim 10, wherein the first circuit is a current source.

13. The device of claim 8, further comprising:
a second circuit that comprises the second transistor and the reference voltage source, wherein the second circuit further comprises:
an operational-amplifier (OP-Amp), wherein a non-inverting node of the OP-Amp is coupled to the reference voltage source and an inverting node of the OP-Amp is coupled to the second source node, and wherein an output node of the OP-Amp is coupled to the second gate node;
a second positive voltage node coupled to the second drain node;
a ground node; and
a current source coupled between the second source node and the ground node.

14. The device of claim 13, wherein the OP-Amp is configured to operate in a linear region, and wherein in response to the OP-Amp being in the linear region, the second source node is set to the reference voltage.

15. A device, comprising:
a first circuit;
a controller;
a first light emitting diode (LED) configured to produce light in response to receiving a first amount of current;
a first group of N first transistors, wherein N is greater than one, wherein each first transistor comprises a first drain node, a first source node, and a first gate node, wherein the first LED is coupled between each first drain node of the N first transistors and a positive voltage node, and wherein the first circuit is coupled between each first source node of the N first transistors and a ground node;

a second transistor that comprises a second source node, and a second gate node, wherein the second transistor is configured to be biased as a source follower with second source node being set at a reference voltage;

each first gate node of the N first transistors is coupled to the second gate node of the second transistor via at least one switch of a group of switches, wherein in response to each first gate node of the N first transistors being connected to the second gate node, each first source node of the N first transistors is configured to be set to the reference voltage to bias the N first transistors in a saturation region and to draw 1/N of first amount of current from the first LED;

wherein the group of switches is configured to: (i) connect each first gate node of the first transistor to the ground node or the second gate node and (ii) the second gate node to the ground node or a third gate node; and a controller configured to determine an amount of current and based at least on the amount of current turns on or off each of the switches of the group.

16. The device of claim 15, further comprising:
a first group of N switches,
wherein the first group of N switches are configured to connect each first gate node of a first transistor to either i) the ground node, or ii) the second gate node, wherein in response to the first gate node being connected to the ground node, the first transistor turns off and does not draw current from the first LED, wherein in response to the first gate node being connected to the second gate node, the first transistor is configured to be biased to turn on and to draw 1/N of the first amount of current from the first LED, and wherein in response to each first gate node of the N first transistors being connected to the second gate node, the first amount of current is drawn by the N first transistors of the first group from the first LED.

17. The device of claim 15, further comprising:
a controller configured to determine a first amount of current for the first LED to produce a first amount of light, wherein the controller is configured to connect first gate nodes of one or more first transistors of a first portion of the first group to the second gate node and to connect first gate nodes of one or more first transistors other than the first portion of the first group to the ground node, wherein the one or more first transistors of the first portion are biased to turn on and the one or more first transistors other than the first portion are turned off, and wherein the one or more first transistors of the first portion are biased to draw one or more times the 1/N of the first amount of current that is equal to the first amount of current from the first LED and the one or more first transistors other than the first portion are biased to draw no current from the first LED.

18. The device of claim 15, further comprising:
a controller;
one or more groups of N first transistors in addition to the first group of N first transistors to provide M groups of N first transistors, wherein the M groups are coupled in parallel and wherein each first transistor comprises the first drain node, the first source node, and the first gate node;

one or more LEDs in addition to the first LED to provide M LEDs, wherein for each group of the M groups, a separate LED is coupled between each first drain node of the N first transistors and the positive voltage node; and one or more other groups of N switches, wherein each group of N switches corresponds to one group of the M groups, wherein the N switches of each group are coupled to the controller, wherein each first gate node of the N first transistors of each group is coupled to the second gate node of the second transistor via at least one switch, and wherein in response to each first gate node of the N first transistors being connected to the second gate node, the first source node of a corresponding first transistor is configured to be set to the reference voltage and to draw 1/N of the first amount of current from an LED.

19. The device of claim 18, wherein the controller is coupled to each one of the N switches of each group of the M groups to alternately connect one or more first gate nodes of the N first transistors of each group to the second gate node to alternately draw current from one of the M LEDs.

20. The device of claim 18, wherein at each instance of time:
i) one or more first transistor of a first group of N first transistors are connected to second gate node,
ii) other first transistors of the first group are turned off to reduce a parasitic capacitor; and
iii) the N first transistors of groups of N first transistors other than the first group are turned off to reduce a capacitance value of the parasitic capacitor.

* * * * *